(12) United States Patent
Pedersen et al.

(10) Patent No.: US 11,333,129 B2
(45) Date of Patent: May 17, 2022

(54) WEIGHING DEVICE FOR A WIND TURBINE ROTOR BLADE

(71) Applicant: Siemens Gamesa Renewable Energy A/S, Brande (DK)

(72) Inventors: David Stien Pedersen, Aalborg (DK); Lasse Einsbohr Poulsen, Aalborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 224 days.

(21) Appl. No.: 16/603,996

(22) PCT Filed: Jan. 9, 2018

(86) PCT No.: PCT/EP2018/050412
§ 371 (c)(1),
(2) Date: Oct. 9, 2019

(87) PCT Pub. No.: WO2018/188820
PCT Pub. Date: Oct. 18, 2018

(65) Prior Publication Data
US 2020/0116131 A1    Apr. 16, 2020

(30) Foreign Application Priority Data

Apr. 12, 2017 (DE) ..................... 10 2017 206 349.1

(51) Int. Cl.
*F03D 13/35* (2016.01)
*F03D 17/00* (2016.01)
(Continued)

(52) U.S. Cl.
CPC .............. *F03D 13/35* (2016.05); *F03D 17/00* (2016.05); *G01G 1/26* (2013.01); *G01L 5/00* (2013.01); *G01G 19/18* (2013.01)

(58) Field of Classification Search
None
See application file for complete search history.

(56) References Cited

U.S. PATENT DOCUMENTS 10,788,017 B2 * 9/2020 Vind .................... G01G 23/002
2008/0216301 A1 9/2008 Hansen et al.
(Continued)

FOREIGN PATENT DOCUMENTS

| CN | 101344422 A | 1/2009 |
| CN | 201819729 U | 5/2011 |

(Continued)

OTHER PUBLICATIONS

German Examination Report dated Nov. 17, 2017 for Application No. 10 2017 206 349.1.
(Continued)

*Primary Examiner* — Juan G Flores
(74) *Attorney, Agent, or Firm* — Schmeiser, Olsen & Watts LLP

(57) ABSTRACT

Provided is a weighing device for determining a property of a rotor blade of a wind turbine. The weighing device includes a first seat for receiving the rotor blade at a first radial position of the rotator blade, a second seat for receiving the rotor blade at a second radial position of the rotor blade, a first weight cell for quantifying a first weight which is acting on the first weight cell, a second weight cell for quantifying a second weight which is acting on the second weight cell, and a first counterweight which is configured to alleviate the first weight. Notably, the first counterweight is lifted up from the ground when the rotor blade is received by the first seat of the weighing device. Furthermore, a method of determining the weight, the mass or the torque of a rotor blade of a wind turbine is also provided.

14 Claims, 4 Drawing Sheets

(51) Int. Cl.
   *G01G 1/26*     (2006.01)
   *G01L 5/00*     (2006.01)
   G01G 19/18      (2006.01)

(56) References Cited

U.S. PATENT DOCUMENTS

| | | | |
|---|---|---|---|
| 2010/0242598 A1* | 9/2010 | Pedersen | G01M 1/12 |
| | | | 73/456 |
| 2011/0049886 A1 | 3/2011 | Becker et al. | |
| 2011/0135469 A1 | 6/2011 | Scholte-Wassink | |

FOREIGN PATENT DOCUMENTS

| | | | | |
|---|---|---|---|---|
| CN | 102278962 | | 12/2011 | |
| CN | 202195872 U | | 4/2012 | |
| CN | 103335059 A | | 10/2013 | |
| CN | 104613128 A | | 5/2015 | |
| DE | 3622908 A1 | * | 1/1988 | ........... F03D 1/0608 |
| KR | WO-2015046651 A1 | * | 4/2015 | ............ G01M 1/122 |
| KR | 20160062653 A | | 6/2016 | |
| RU | 2204117 C2 | | 5/2003 | |
| RU | 2204117 C2 | * | 5/2003 | |
| WO | 2017148486 A1 | | 9/2017 | |
| WO | 2018188820 A1 | | 10/2018 | |

OTHER PUBLICATIONS

Office Action in corresponding Chinese Patent Application No. 201880039212.7 dated Oct. 30, 2020. 11 pages.
International Search Report for application No. PCT/US2018/050412 dated May 9, 2018.

\* cited by examiner

WEIGHING DEVICE FOR A WIND TURBINE ROTOR BLADE

CROSS-REFERENCE TO RELATED APPLICATIONS

This application claims priority to PCT Application No. PCT/EP2018/050412, having a filing date of Jan. 9, 2018, Which is based on German Application No. 10 2017 206 349.1, having a filing date of Apr. 12, 2017, the entire contents both of which are hereby incorporated by reference.

FIELD OF TECHNOLOGY

The following relates to a weighing device for determining a property of a rotor blade for a wind turbine, such as the weight, the mass or the torque of the rotor blade. The following also relates to the use of such a weighing device and a method of determining one of the mentioned properties of a wind turbine rotor blade.

BACKGROUND

When providing a wind turbine with rotor blades, it is important that all rotor blades have a similar torque. A similar torque of all rotor blades avoids imbalances of the rotor due to different torques. This avoids problematic vibrations during operation of the wind turbine, i.e. during rotation of the rotor of the wind turbine. Regarding the torque differences, even small deviations of the respective torques of the rotor blades can lead to these vibrations. Generally, deviations of more than one percent, in particular of more than 0.5 percent of the torque of one single rotor blade shall be avoided.

Therefore, a high accuracy during determination of the torque of a rotor blade after manufacturing is required.

Conventionally, a weighing device for a rotor blade comprises a weight cell which can, for instance, be designed with a spring or similar means for quantifying the weight which is due to the mass of the rotor blade and which is acting on the weight cell. Weight cells are regularly available in the market. However, conventional weight cells have a certain limit regarding the accuracy.

Currently, it is accepted that the accuracy of the determination of the weight of a rotor blade is heavily influenced by the accuracy of the weight cell of the weighing device which is used.

The present embodiments of the invention aim in particular to providing a concept which improves the current situation. Generally, the embodiments of the invention aim to provide a device which is able to determine a property of a rotor blade of a wind turbine with high accuracy.

Such a concept is disclosed in the independent claims. Advantageous modifications and variations are disclosed in the dependent claims.

There is provided a weighing device for determining a property of a rotor blade of a wind turbine. The weighing device comprises a first seat for receiving the rotor blade at a first radial position of the rotor blade, a second seat for receiving the rotor blade at a second radial position of the rotor blade, a first weight cell for quantifying a first weight which is acting on the first weight cell, a second weight cell for quantifying a second weight which is acting on the second weight cell, and a first counterweight which is configured to alleviate the first weight. Notably, the first counterweight is lifted up from the ground when the rotor blade is received by the first seat of the weighing device.

A weighing device is also referred to as a weighing scale or, simply, a scale. A weighing device is referred to as a device which is able to determine a weight of an object. In this case, the weighing device is destined for determining a property of a rotor blade, wherein the rotor blade is suitable to be used at a wind turbine. Note that, in principle, the present embodiments of the invention can be used for determining the mass of any object, in particular heavy objects featuring a mass above e.g. one ton. An example of an object which is somehow similar to a wind turbine rotor blade and which could be assessed by the present device is, for instance, a rotor blade for marine current turbines.

The weighing device comprises means for receiving the rotor blade. In other words, it comprises means for accommodating and placing the object to be weighed, in this regards means for placing the rotor blade.

Furthermore, the weighing device comprises means for quantifying the force which is acting on it. Therefore, a weight cell, which can be designed like a spring, for example a metal spring, is used, wherein the weight cell can be compressed by a force which is acting on it.

As it is well-known for the person skilled in the art, the weight of an object is defined as the force which is acting on the object due to the gravity. The weight is usually described and referenced in the unit of Newton. The ratio of the weight and the (local) gravitational acceleration g is defined as the mass of the object. The mass of the object is a parameter or characteristic which is independent of the location where the object is situated. The weight cell is thus able to quantify the weight which is acting on it, and therefore indirectly the mass of the object.

SUMMARY

A key aspect of the present embodiments of the invention is that in contrast to the prior art where the weight cell is experiencing the entire weight of the rotor blade (in the case of several weight cells, the entire weight of the rotor blade is experienced by several weight cells), in the present concept of a weighing device there is provided a counterweight which is chosen such that it takes away one part of the weight acting on the weight cell, such that the weight cell is only required to act in a "limited" regime.

To give a concrete example, the weighing device may comprise a first unit which is placed in close vicinity to the root of the rotor blade and a second unit which is placed at two thirds of the blade length, as measured from the root. Exemplarily, the length of the rotor blade is sixty meters and the mass of the rotor blade is twenty tons. Multiplying the mass with a gravitational acceleration of 9.81 m/s$^2$ results in a weight of the rotor blade of approximately 196 kilo Newton. Furthermore, it is assumed that the distance of the root to the center of the rotor (axis) is 2 meters, in the mounted state of the rotor blade.

It is assumed that the torque of the rotor blade shall be determined, wherein, for sake of simplicity, the torque of the rotor blade is defined as the sum of (i) the product of the first weight and the distance of the first unit to the rotor center with (ii) the product of the second weight and the distance of the second unit to the rotor center.

Thus, if, exemplarily, the first unit is placed 0.5 meters away from the root and the first weight cell measures a first weight of 150 kilo Newton, while the second unit is placed 40 meters away from the root and measures 46 kilo Newton, the torque of the rotor blade would sum up to 2.5*150 kilo Newton*meter+42*46 kilo Newton*meter=2307 kilo Newton*meter.

Conventionally, the first weight cell is required to bear a weight of 150 kilo Newton and the second weight cell is required to bear a weight of 46 kilo Newton.

The benefit of the inventive weighing device would be to add a counterweight. The counterweight could be added to the first unit and is thus referred to as the first counterweight. If, for example, the first counterweight has a mass of 14 tons, which is equivalent to ca. 137 kilo Newton, the first weight cell would only be required to bear a weight of 13 kilo Newton. This results in a significantly improved accuracy of the weight measurement which is carried out by means of the first weight cell.

Therefore, advantageously, a rough estimation of the mass of the rotor blade is made, and based on that estimation, a certain safety margin is deduced from the expected mass such that the mass of the counterweight is safely below the actual mass of the rotor blade to be measured. In practice, it is realistic that the approximate mass of the rotor blade is estimated correctly, as deviations of the actual mass compared to the targeted mass are expected only up to a certain extent. The difference between the mass of the counterweight and the mass of the rotor blade can be in the range of less than 10 percent, in particular less than 5 percent of the mass of the rotor blade.

Note that the first counterweight is lifted up from the ground when the rotor blade is received by the first seat of the weighing device.

In other words, when the rotor blade is placed on the weighing device, the first counterweight is fully lifted up from the ground and the additional weight, which is still acting on the first weight cell, is then quantified by the first weight cell.

Although the seat of the weighing device could have in principle a lengthwise extension which is similar to the total length of the rotor blade to be measured, it is advantageous to choose a longitudinal, i.e. lengthwise extension of the seat which is smaller and advantageously much smaller than the total length of the rotor blade. In general, it is only required that the rotor blade is safely positioned and fixed. For this regard, there is normally only required a length of less than a few percent of the total length of the rotor blade.

In another embodiment of the invention, the rotor blade Which comprises a leading edge section and a trailing edge section is placed such into the seat of the weighing device that the leading edge section of the rotor blade is facing the seat of the weighing device.

This is advantageous because typically the leading edge section of the rotor blade is relatively round, while the trailing edge section may feature sharp edges and may be delicate to handle. In particular, it is generally not desired that the delicate trailing edge is supporting the total weight of the rotor blade.

In another embodiment of the invention, the weighing device is configured such that it is designed as one entire system, such that the counterweight is integrated and directly connected to the seat. Alternatively, the seat and the counterweight may be designed separately from each other. In the latter case, there is the advantage that the conventional seat with the weight cell can be used and that there is only added the counterweight part of it. Note that if this embodiment is realized, the weight cell itself might be substituted as the weight which the weight cell needs to be determined is different.

In another embodiment of the invention, the first radial position is located between the root of the rotor blade and twenty per cent of the blade length, as measured from the root.

It is advantageous that the first radial position is in immediate vicinity to the root of the rotor blade for several reasons. First, the cross section of the rotor blade is typically circular at the root, thus the rotor blade can neatly be placed into the first seat of the weighing device. Second, a provision of a corresponding support mechanism to align and support the placement of the rotor blade into the first seat can more easily carried out at the root than further outboard of the rotor blade.

Regarding the second radial position, i.e. the position where the second unit of the weighing device is placed, it has been proven that a location between sixty per cent and eighty per cent of the blade length, as measured from the root of the rotor blade, is advantageous. This is due to the fact that if the second unit is placed too much outboard, e.g. at the tip section of the rotor blade, there exists the risk that the rotor blade hangs down and touches the ground, instead of being safely and reliably received by the second seat. Note in this respect that the center of gravity is between one quarter and one half of the length of the blade, as measured from the root of the blade, for many typical rotor blades.

In another embodiment of the invention, the mass of the first counterweight is chosen such that the product of the mass of the first counterweight and the gravitational acceleration is smaller than an expected value for the first weight acting on the first weight cell.

Advantageously, the weighing device comprises a second counterweight which is configured to alleviate the second weight.

Note that an advantageous and relevant effect can already be obtained by only equipping one weight cell with a counterweight (e.g. the first weight cell). However, an even further increase of the accuracy of the weight measurement can be obtained by also providing a counterweight for the second weight cell, namely a second counterweight. Obviously, the mass of the second counterweight needs to be adapted with regard to the expected "load" of the second weight cell, i.e. the weight, which is expected to act on the second weight cell.

In other words, the mass of the second counterweight is chosen such that the product of the mass of the second counterweight and the gravitational acceleration is smaller than an expected value for the second weight acting on the second weight cell.

In yet another embodiment, the mass of the first counterweight is smaller than the mass of the second counterweight, in particular smaller than thirty per cent of the mass of the second counterweight.

Generally speaking, the above described weighing device is suitable to determine a "property", i.e. a characteristic or parameter or measurement quantity, of the rotor blade. Examples of suitable parameters are the weight, the mass or the torque of the rotor blade.

It is assumed that the weight cells, i.e. the first weight cell and the second weight cell, measure the weight which is acting on them, respectively, in unities of Newton.

Then, the weight of the rotor blade is determined by simply adding the weight which is acting on the first weight cell, i.e. the first weight, with the weight which is acting on the second weight cell, i.e. the second weight.

The mass of the rotor blade is also determined in a simple and straightforward manner: either the weight of the total blade is first determined according to the procedure above and, subsequently, the calculated weight is divided by the gravitational acceleration; or the first weight is divided by the gravitational acceleration in order to determine a first mass, the second weight is divided by the gravitational acceleration in order to determine a second mass, and subsequently the first MSS and the second mass are added together.

Finally, the present weighing device may also be used to determine a torque of the rotor blade.

As it is known to the person skilled in the art, no torque can be assigned to a rotor blade as such. Torque, which is also referred to as moment or moment of force is a rotational force which can be expressed by the (cross) product of the weight of an object and its distance away from the turning point. In the case of a rotor blade of a wind turbine, the assignment of a torque to the rotor blade makes sense, because the rotor blade is destined to be mounted to a hub and is destined to rotate about a rotational rotor axis.

In a simplified manner, the weight at a first radial position is determined and the weight at a second radial position. Thus, for determining the torque of a wind turbine blade by means of the inventive weighing device, the first weight cells needs to measure the first weight which is acting on it, the second weight cells needs to measure the second weight, and subsequently both weights need to be multiplied by the respective distance to the (supposed) center of the rotor of the wind turbine.

Advantageously, the rotor blade is placed with high accuracy into the first seat of the weighing device, namely with an accuracy only accepting deviations of less than 0.1 percent of the total length of the rotor blade with regard to its predetermined position. This means that in the case of a 100 meters long rotor blade, deviations during positioning of the rotor blade are advantageously smaller than 10 centimeters.

BRIEF DESCRIPTION

Some of the embodiments will be described in detail, with references to the following Figures, wherein like designations denote like members, wherein.

Note that the drawings are in schematic form. Furthermore, similar or identical elements may be referenced by the same reference signs.

DETAILED DESCRIPTION

Figure 1:
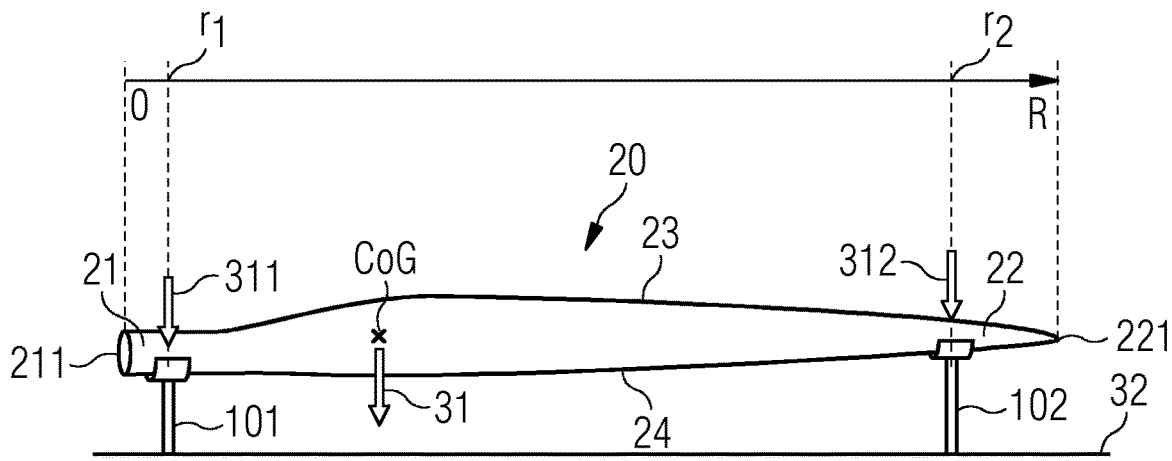
FIG. 1 shows a weighing device according to the state of the art.

In FIG. 1 there is illustrated a weighing device comprising two units, a first unit 101 at a first radial position $r_1$ and a second unit 102 at a second radial position $r_2$, according to the state of the art. The weighing device is arranged and prepared for determining a weight of a rotor blade 20. The rotor blade 20 comprises a root section 21 with a root 211 and a tip section 22 with a tip 221. The rotor blade 20 has a total length R of, for example, sixty meters. Furthermore, the rotor blade 20 comprises a trailing edge section 23 and a leading edge section 24. The weighing device is placed on the ground 32. The ground 32 could be the floor of a factory hall or it could be outdoor, either on the site where the rotor blade has been manufactured or at any other site.

The weighing device 10 is placed on the ground 32. The first unit 101 comprises a first seat 11 and the second unit 102 comprises a second 111. The longitudinal extension 33 of the first seat 11 is small, in particular significantly smaller than the total length R of the rotor blade 20. The longitudinal extension R of the seat 11 is advantageously just as long as to ensure that the rotor blade 20 is safely received by the weighing device and that no damages occur to the leading edge section 24 of the rotor blade 20 during weighing the rotor blade 20. The weighing device 10 comprises furthermore a first weight cell and a second weight cell which are not illustrated in FIG. 1 for sake of clarity. These two weight cells carry the complete weight of the rotor blade 20 and quantify the weight which is acting on them. Based on the measured weight, the mass or the torque of the rotor blade may e.g. be calculated.

Finally, FIG. 1 symbolizes the (total) weight 31 acting on the rotor blade in its center of gravity COG, as well as the first weight 311 acting on the first unit 101 and the second weight 312 acting on the second unit 102.

Figure 2:
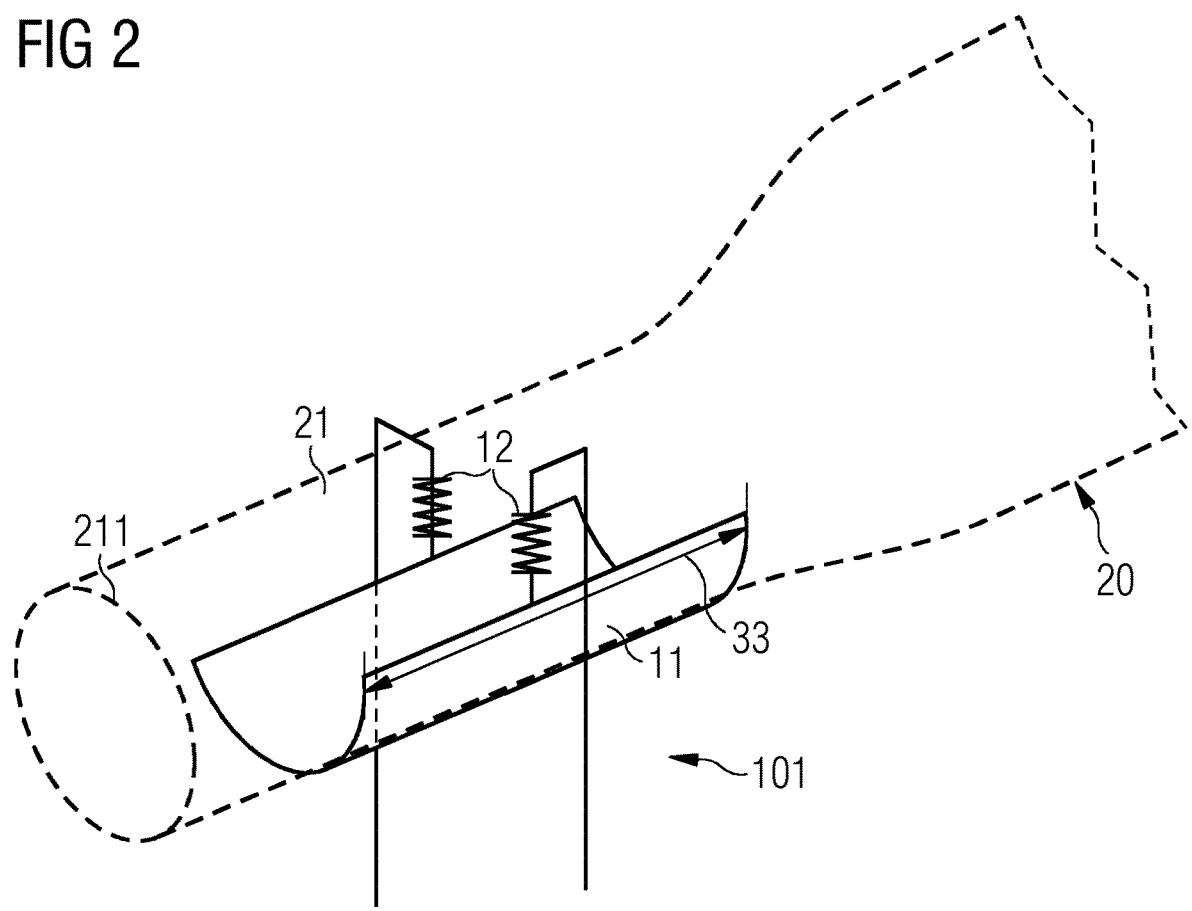
FIG. 2 shows a detailed view of the seat being destined for the root section of the rotor blade according to the state of the art.

FIG. 2 shows a detailed view of one of the parts of the weighing device of FIG. 1, namely the first unit 101. It is located at the root section 21 of the rotor blade 20 and comprises the first seat 11 with two weight cells 12. The first seat 11 is shaped with a curvature corresponding to the curvature of the blade shell of the rotor blade at the respective spanwise (lengthwise) position, namely at the root section 21 of the rotor blade 20. At both rims or edges of the first seat 11, one first weight cell 12 is arranged and each first weight cell 12 is then connected to the ground 32 by a suitable construction.

Figure 3:
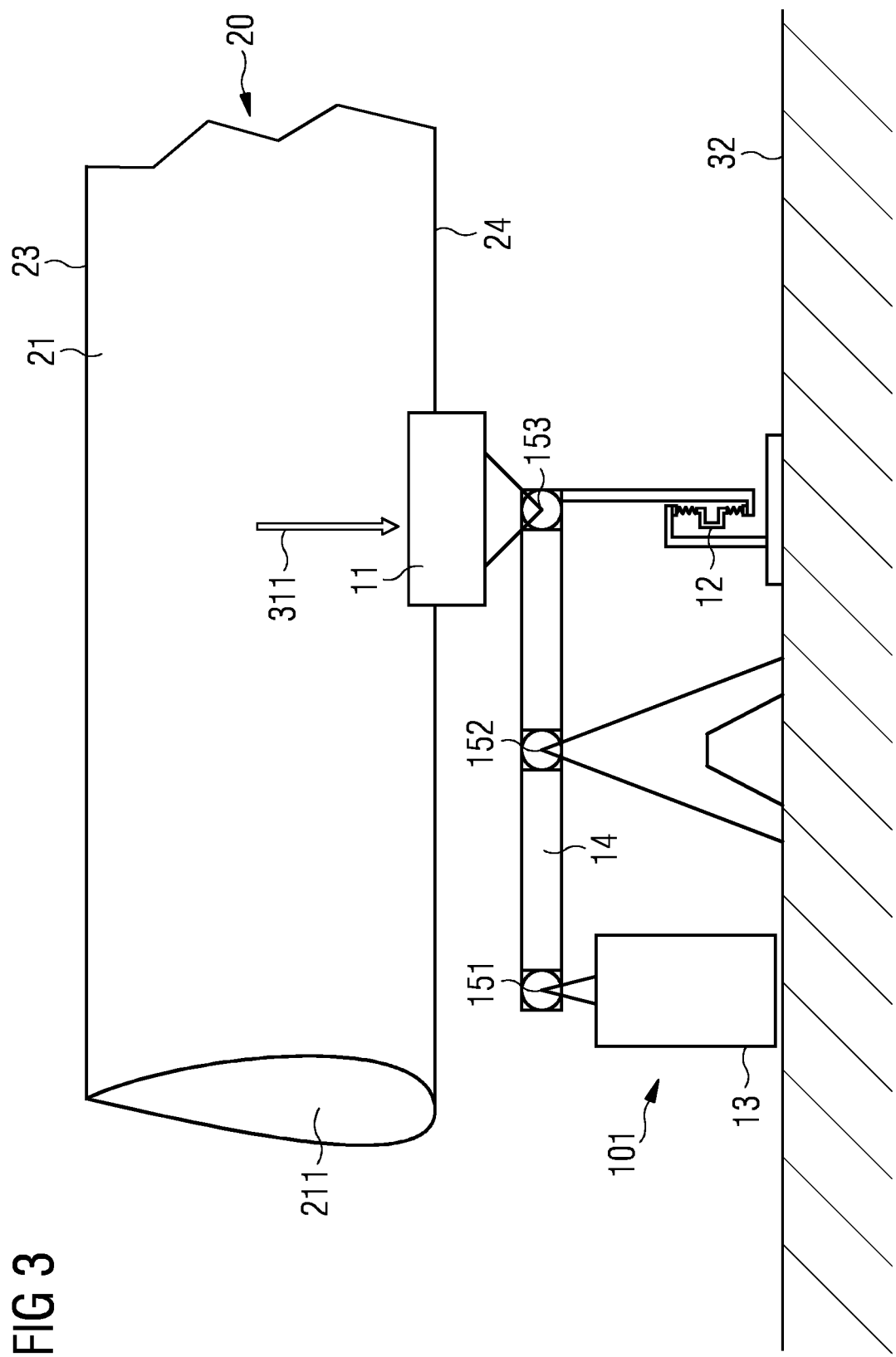
FIG. 3 shows a weighing device in a first embodiment of the invention.

FIG. 3 shows a first embodiment of the inventive weighing device, its principle and abstract construction is at a first view similar to the prior art one which is shown in FIG. 1 and FIG. 2. The weighing device also comprises a first seat 11 which is arranged and prepared to receive a leading edge section 24 of a rotor blade 20. It is even arranged and prepared for receiving the root section 21 of the rotor blade 20. The first seat 11 is also connected and linked to a first weight cell 12 which is able to measure and quantify the first weight 311 which is acting on it.

Additionally, however, there is also connected to the first seat 11 and the first weight cell 12 a beam 14 with three hinges 151, 152, 153 and a first counterweight 13. The first hinge 151, which is also referred to as the counterweight hinge 151, connects the first counterweight 13 to the beam 14. The second hinge 152, which is referred to as the tipping point hinge 152, is able to provide for a swiveling movement of the beam 14 with regard to the ground 32. Lastly, the third hinge 153, namely the blade hinge 153, connects the first seat 11 with the beam 14.

In the case that the rotor blade 20 is not placed into the first seat 11, the first counterweight 13 stands on the ground 32. The mass of the first counterweight 13 is chosen such that it represents a torque which is safely smaller than the force or the torque which is acting on the first seat 11 and in particular on the first weight cell 12 if the rotor blade 20 is placed into the first seat 11. This requires of course a certain knowledge of the expected mass and torque of the rotor blade. In practice, a reasonable estimation of the expected mass of the rotor blade to be measured shall be feasible without major problems. When the rotor blade 20 is placed into the first seat 11, the first counterweight 13 is lifted up from the ground 32 and the residual weight is then acting on the first weight cell 12. This allows a significantly increased accuracy of the first weight cell 12.

Figure 4:
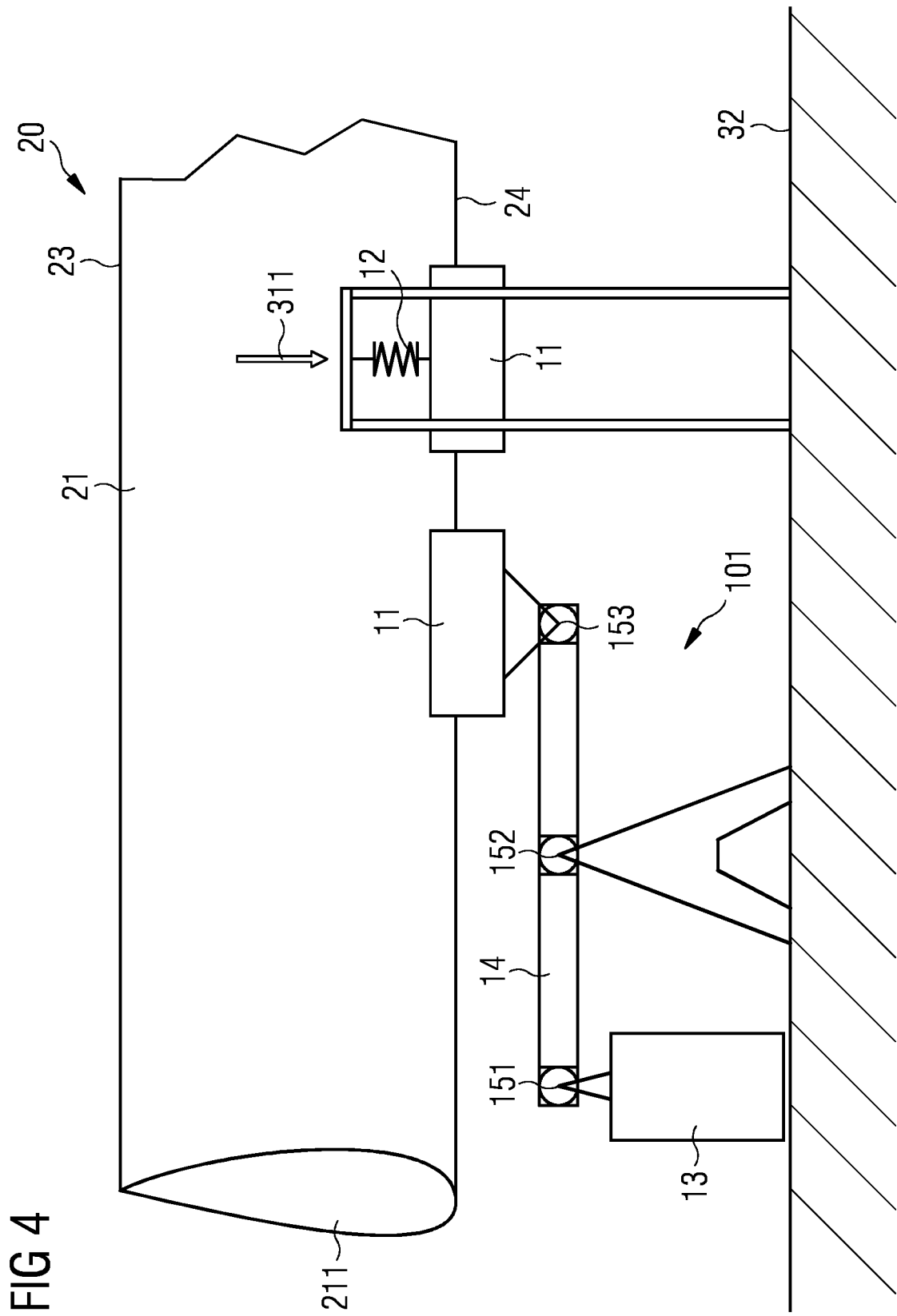
FIG. 4 shows a weighing device according to a second embodiment of the invention.

The second embodiment of the invention as shown exemplarily in FIG. 4 visualizes that the alleviation of the first weight 31 which is acting on the first weight cell 12 by using the first counterweight 13 can also be realized by a completely separate part. This has the advantage that the part with the first weight cell 12 may be taken without making any amendments compared to the used weighing device of the prior art. Again, the first mass of the first counterweight 13 has to be carefully chosen and the position where the rotor blade is placed into the first seat 11 needs to be carefully chosen as well.

Figure 5:
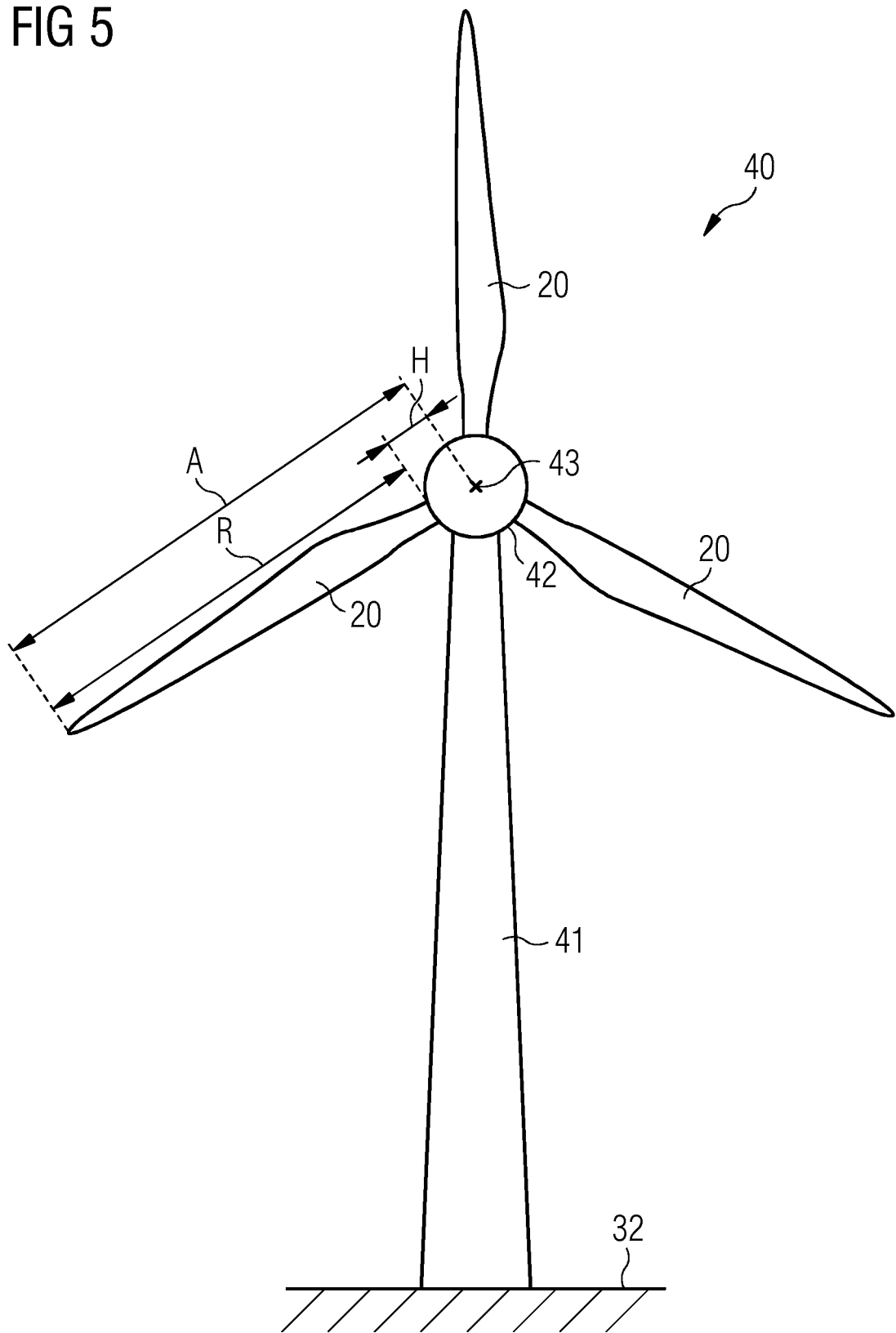
FIG. 5 illustrates a front view of a wind turbine.

Finally, FIG. 5 visualizes a front view on a wind turbine 40 in order to illustrate the torque attributed to a rotor blade of a wind turbine.

The wind turbine 40 comprises a tower 41. The tower 41 ensures that the wind turbine 40 is safely and firmly connected with the ground 32 by one end. By the other end, the tower is connected with the nacelle (not visible in FIG. 5). The wind turbine 40 furthermore comprises a hub 42 with a rotor 43. The rotational axis of the rotor is aligned substantially horizontal (although most wind turbines have a tilted rotor which is inclined slightly upwards at the end, where the hub is located). Three rotor blades 20 are mounted to the hub 42. Each rotor blade 20 has a length R. The torque of a rotor blade 20 mounted to the hub 42 can thus be seen as the integral of the distribution of the weight of the rotor blade 20, wherein integration takes place from the rotor center to the tip of the rotor blade.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A weighing device comprising:
   a first seat for receiving a rotor blade at a first radial position of the rotor blade;
   a second seat for receiving the rotor blade at a second radial position of the rotor blade;
   a first weight cell for quantifying a first weight which is acting on the first weight cell;
   a second weight cell for quantifying a second weight which is acting on the second weight cell; and
   a first counterweight configured to alleviate the first weight;
   wherein the first counterweight is lifted up from a ground when the rotor blade is received by the first seat of the weighing device.

2. The weighing device according to claim 1, wherein:
   the rotor blade comprises a leading edge section and a trailing edge section, and
   the rotor blade is placed into the first seat of the weighing device such that the leading edge section of the rotor blade is facing the first seat of the weighing device.

3. The weighing device according to claim 1, wherein a longitudinal extension of the first seat of the weighing device is smaller than ten percent of a length of the rotor blade.

4. The weighing device according to claim 1, wherein the first radial position is located between a root of the rotor blade and twenty percent of a blade length, as measured from the root.

5. The weighing device according to claim 1, wherein the second radial position is located between sixty percent and eighty percent of a blade length, as measured from a root of the rotor blade.

6. The weighing device according to claim 1, wherein a mass of the first counterweight is chosen such that a product of the mass of the first counterweight and a gravitational acceleration is smaller than an expected value for the first weight acting on the first weight cell.

7. The weighing device according to claim 1, wherein the weighing device includes a second counterweight which is configured to alleviate the second weight.

8. The weighing device according to claim 7, wherein a mass of the second counterweight is chosen such that a product of the mass of the second counterweight and a gravitational acceleration is smaller than an expected value for the second weight acting on the second weight cell.

9. The weighing device according to claim 8, wherein a mass of the first counterweight is smaller than the mass of the second counterweight.

10. A method of determining a weight of a rotor blade of a wind turbine by means of a weighing device according to claim 1, wherein the weight of the rotor blade is determined by adding the first weight and the second weight.

11. A method of determining a mass of a rotor blade of a wind turbine by means of a weighing device according to claim 1, wherein:
    a weight of the rotor blade is determined and subsequently the weight is divided by a gravitational acceleration, or
    the first weight is divided by the gravitational acceleration for determination of a first mass, the second weight is divided by the gravitational acceleration for determination of a second mass, and subsequently the first mass and the second mass are added together.

12. A method of determining a torque of a rotor blade of a wind turbine by means of a weighing device according to claim 1, when the rotor blade is rotatably mounted to a rotor of the wind turbine via a root of the rotor blade, wherein the torque of the rotor blade is determined by adding: a product of the first weight and a distance of the first radial position to a center of the rotor with a product of the second weight and a distance of the second radial position to the center of the rotor.

13. The method of determining the torque according to claim 12, wherein the rotor blade is in a first step placed at a predetermined position into the first seat of the weighing device.

14. The method according to claim 13, wherein an actual position of the rotor blade in the first seat of the weighing device deviates in lengthwise direction by less than 0.5 percent of the length of the rotor blade from the predetermined position of the rotor blade.

* * * * *